US009973004B2

(12) United States Patent
Holmgren et al.

(10) Patent No.: US 9,973,004 B2
(45) Date of Patent: May 15, 2018

(54) CHANGE OF CURRENT RETURN PATH IN A BIPOLE POWER TRANSMISSION SYSTEM

(71) Applicant: ABB Schweiz AG, Baden (CH)

(72) Inventors: Tommy Holmgren, Ludvika (SE); David Shearer, Ludvika (SE); Felipe Sobrinho, Sao Paulo (BR); Hector-Armando Avila, Ludvika (SE); Per-Erik Björklund, Bjursås (SE); Sören Nyberg, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days. days.

(21) Appl. No.: 15/569,906

(22) PCT Filed: May 18, 2015

(86) PCT No.: PCT/EP2015/060904
§ 371 (c)(1),
(2) Date: Oct. 27, 2017

(87) PCT Pub. No.: WO2016/184496
PCT Pub. Date: Nov. 24, 2016

(65) Prior Publication Data
US 2018/0109109 A1    Apr. 19, 2018

(51) Int. Cl.
*H02J 1/06* (2006.01)
*H02J 3/36* (2006.01)
*H02M 7/757* (2006.01)

(52) U.S. Cl.
CPC ............... *H02J 3/36* (2013.01); *H02J 1/06* (2013.01); *H02M 7/7575* (2013.01)

(58) Field of Classification Search
CPC ............ H02J 1/06; H02J 1/08; H02M 7/7575
See application file for complete search history.

(56) References Cited

U.S. PATENT DOCUMENTS

2011/0175460 A1* 7/2011 Astrom ............... H01H 33/596
307/112
2013/0322131 A1* 12/2013 Sun ........................ H02J 3/36
363/35

FOREIGN PATENT DOCUMENTS

CN    102157929 A    8/2011
EP    0 645 867 A1    3/1995
(Continued)

OTHER PUBLICATIONS

International Preliminary Report on Patentability, issued in PCT/EP2015/060904, dated May 18, 2017.
(Continued)

*Primary Examiner* — Harry Behm
(74) *Attorney, Agent, or Firm* — Birch, Stewart, Kolasch & Birch, LLP

(57) ABSTRACT

An arrangement for changing current return path in a bipole direct current power transmission system includes a converter station having an active and a passive converter connected in series between an active and a passive pole line via a first neutral bus, a metallic return transfer switch in an electrode line, a ground return transfer switch in a current redirecting path between the passive pole line and the neutral bus and a control unit which in case of change to the passive pole line for providing a return current path is configured to, upon control of power related to the active converter from steady-state to zero, close the ground return transfer switch and thereafter open the metallic return transfer switch, whereupon power related to the active converter may be controlled back to steady state.

27 Claims, 3 Drawing Sheets

(56) References Cited

FOREIGN PATENT DOCUMENTS

WO     WO 2014/146241 A1     9/2014
WO     WO 2014176726 A1 * 11/2014   ............... H02J 3/36

OTHER PUBLICATIONS

International Search Report, issued in PCT/EP2015/060904, dated Feb. 10, 2016.
Written Opinion of the International Searching Authority, issued in PCT/EP2015/060904, dated Feb. 10, 2016.

\* cited by examiner

CHANGE OF CURRENT RETURN PATH IN A BIPOLE POWER TRANSMISSION SYSTEM

FIELD OF INVENTION

The present invention generally relates to power transmission systems. More particularly the present invention relates to an arrangement, method and computer program product for changing current return paths in a bipole direct current power transmission system.

BACKGROUND

Bipole power transmission systems are frequently used for transmitting Direct Current (DC) power between two or more terminals or converter stations of the power transmission system.

In its simplest form the DC power transmission system comprises one DC connection between a first converter acting as a rectifier and a second converter acting as an inverter.

A first converter station, which is provided at a first end of such a DC connection, will then comprise two converters connected in series between two pole lines via a neutral bus and the same configuration is typically provided at the opposite second end of the DC connection.

In this case the neutral bus on each side is typically connected to an electrode line which interconnects the neutral bus with a ground electrode for grounding purposes. It also makes the poles independent with regard to reliability.

It is at times necessary to disconnect one of the converters of such a converter station, for instance because there may be a fault or a converter needing maintenance. When this happens also the corresponding converter at the other end of the line has to be disconnected and refrained from being used. This will lead to the system in essence acting as an asymmetric monopole system. The disconnected converters and the pole lines they are connected to are thus all passive.

In some instances when there is an active and a passive pole line in the above described way, it is of interest to use a metallic return path via the passive pole line instead of or in addition to the ground return path via the ground electrode and the electrode line. There may exist a number of reasons for this, where one may be environmental concerns. In order to perform path changes DC breaking functionality is used in the the electrode line as well as in a current redirecting path used for connection to the passive pole.

The problem with such a change is that DC currents do not have any zero crossings. This has lead to the use of large and bulky DC breaker functionality being used in the electrode lines. In such a DC breaker, sometimes termed a metallic return transfer breaker, there is a switch connected in parallel with a resonance circuit formed by a reactor in series with a capacitor, which are in turn connected in parallel with a non linear resistor. In use the resonance circuit together with a negative resistance of an arc through the switch forms a current zero crossing enabling the opening of the DC switch. The non linear resistor in turn generates a counter voltage forcing the current through the electrode line over to the passive pole line.

However, the requirement of a resonance circuit and a non linear resistor makes the breaker complicated, bulky, maintenance intensive and also expensive.

The same problems are at hand also in the current redirecting path.

It is in view of what has been described above of interest to obtain a simpler arrangement that does not require circuit breaking functionality, but only a switch. If a resonance circuit and non linear resistor can be omitted then considerable simplification and savings are possible in the converter station.

The present invention addresses one or more of the issues mentioned above.

SUMMARY OF THE INVENTION

The present invention is directed towards providing an improvement in the changing of return paths in a bipole direct current power transmission system.

This object is according to a first aspect of the present invention achieved through an arrangement for changing current return path in a bipole direct current power transmission system, the arrangement comprising: a first converter station providing an interface of the bipole direct current power transmission system and having an active and a passive converter connected in series between an active pole line and a passive pole line via a first neutral bus,
a first electrode line connected to the first neutral bus,
a ground return transfer switch connected in a first current redirecting path between the passive pole line and the first neutral bus, and
a first control unit which, in the case of a change in return current path and upon control of power related to the active converter from a steady-state power level to zero, is configured to
operate the ground return transfer switch to change between an open and a closed state, whereupon the power related to the active converter may be controlled back to the steady state power level.

This object is according to a second aspect achieved through a method for changing current return path in a bipole direct current power transmission system comprising a first converter station providing an interface of the bipole direct current power transmission system and having an active and a passive converter connected in series between an active pole line and a passive pole line via a first neutral bus,
a first electrode line connected to the first neutral bus,
a ground return transfer switch connected in a first current redirecting path between the passive pole line and the first neutral bus, the method is performed in the bipole direct current power transmission system and comprises:

in the case of a change in return current path and upon control of power related to the active converter from a steady-state power level to zero,
operate the ground return transfer switch to change between an open and a closed state, whereupon the power related to the active converter may be controlled back to the steady state power level.

The object is according to a third aspect achieved through a computer program product for changing current return path in a bipole direct current power transmission system comprising a first converter station providing an interface of the bipole direct current power transmission system and having:

an active and a passive converter connected in series between an active pole line and a passive pole line via a first neutral bus,
a first electrode line connected to the first neutral bus,
a ground return transfer switch connected in a first current redirecting path between the passive pole line and the first neutral bus, the computer program product comprising a data carrier with computer program code implementing the functionality of a control unit of at least the first converter station, the computer program code being configured to, when the code is loaded in a computer that implements the control unit and in case of a change in return current path as well as upon control of power related to the active converter from a steady-state power level to zero, operate the ground return transfer switch to change between an open and a closed state, whereupon the power related to the active converter may be controlled back to the steady state power level.

A change between an open and a closed state is either a change from an open state to a closed state or a change from a closed state to an open state.

The present invention has a number of advantages. The arrangement is simple in construction, comprises few and small elements. The arrangement is therefore economical. Furthermore the change of return current path is also fast.

BRIEF DESCRIPTION OF THE DRAWINGS

The present invention will in the following be described with reference being made to the accompanying drawings, where FIG. 1 schematically shows a bipole power transmission system where there is a first converter station connected to one end of a DC connection and a second converter station connected to the opposite end of the DC connection, where each converter station is provided with a control unit, FIG. 2 schematically shows a number of method steps being performed in a first control unit in the first converter station, FIG. 3 schematically shows method steps being performed in a second control unit in the second converter station, FIG. 4 schematically shows a sequence of control signals and current through an electrode line and a passive pole line.

DETAILED DESCRIPTION OF THE INVENTION

In the following, a detailed description of preferred embodiments of the invention will be given.

Figure 1:
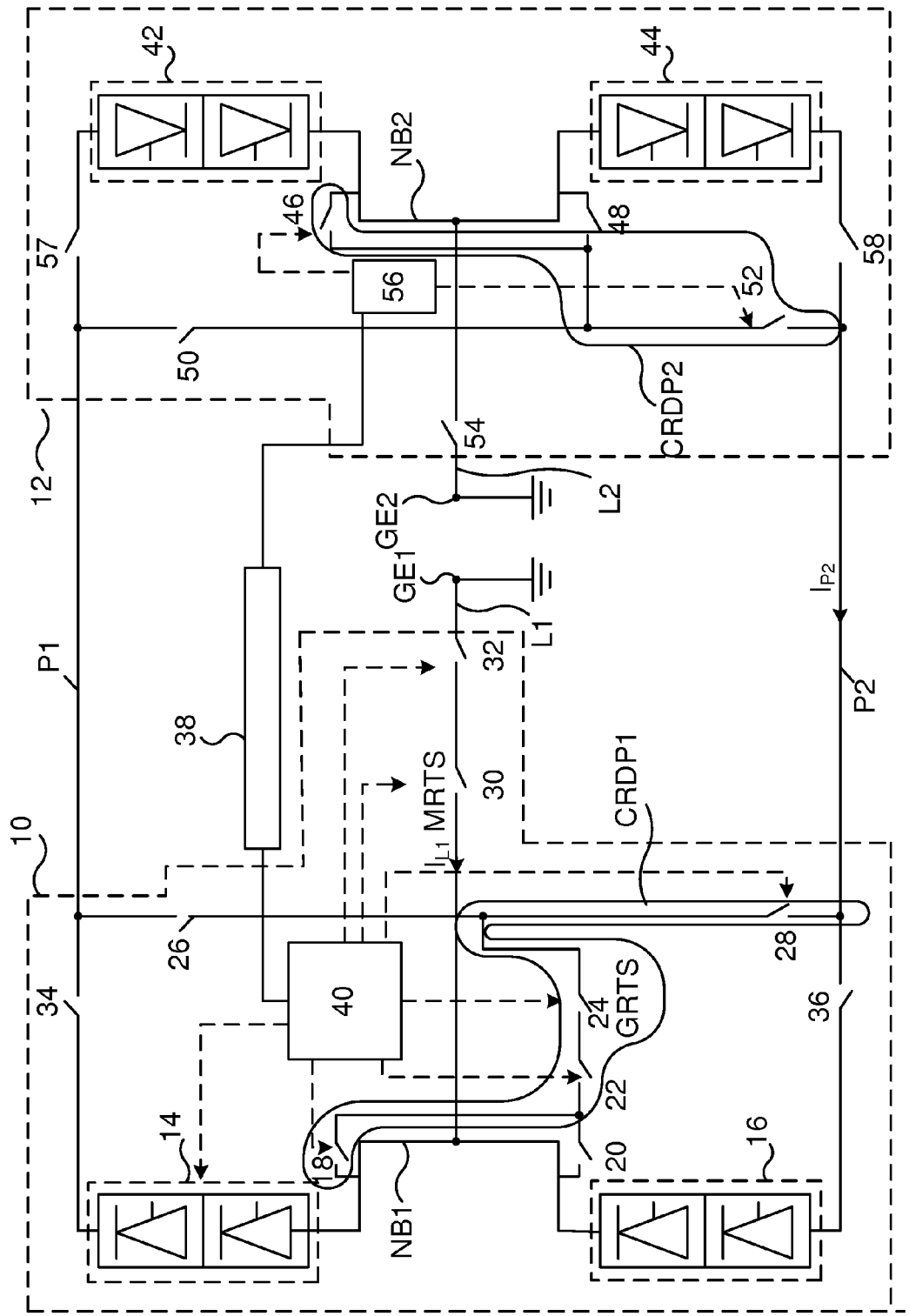

FIG. 1 schematically shows a simplified bipole direct current (DC) power transmission system. In this simplified system there is a first converter station 10 connected to a first end of a DC connection and a second converter station 12 connected to a second end of the DC connection, where the DC connection comprises a first DC line or DC pole line P1 and a second DC line or DC pole line P2.

The DC power transmission system is simplified in that there are only two converter stations interconnected via a single DC connection. It should however be realized that it is possible to interconnect several converter stations in a system using several DC connections. This type of system may also be termed a DC grid.

In the first converter station 10 there is a first converter 14 having a first end connected to the first pole line P1 of the DC connection via a first pole line disconnector 34 and a second end connected to a first end of a second converter 16 via a first neutral bus NB1. A second end of the second converter 16 is connected to the second pole line P2 of the DC connection via a second pole line disconnector 36.

Each converter 14 and 16 is furthermore made up of two valve bridges, an upper valve bridge and a lower valve bridge connected to an alternating current (AC) system, usually via a transformer (not shown) providing galvanic separation. Thereby the first converter station 10 provides an interface of the bipole power transmission system. It thus provides an interface of this DC system to the AC system. In the bipole DC power transmission system in FIG. 1, the converters 14 and 16 in the first converter station 10 are current source converters, for instance converters based on thyristors for current control. In the system, the converters 14 and 16 of the first converter station 10 furthermore act as a rectifier delivering power to the second converter station 12. Therefore also the thyristors are firing angle controlled in order to transmit power over the first and second pole lines P1 and P2 to the second converter station 12. It is also possible that the converters 42 and 44 of the second converter station 12 act as a rectifier if power is to be delivered in the opposite direction, in which case it is the converters 42 and 44 that control the current flowing in the DC system. In this case the first converter station 10 acts as an inverter.

It should here be realized that it is possible that the converters 14 and 16 of the first converter station 10 are voltage source converters instead, which may either be two-level converters, multilevel converters using cells or variations in-between these types.

In the exemplifying system of FIG. 1, the second converter station 12 has a similar structure as the first converter station 10. There is in the second converter station 12 thus a first end of a first converter 42 connected to the first pole line P1 via a pole line disconnector 57 and a second end of a second converter 44 connected to the second pole line P2 via a pole line disconnector 58. A second end of the first converter 42 is furthermore connected to a first end of the second converter 44 via a second neutral bus NB2. In this case the converters 42 and 44 are inverters made up of valve bridges in analogy with the valve bridges of the converters 14 and 16 of the first converter station 10, where these valve bridges are connected to another AC system via transformers (not shown). Thereby the second converter station 12 also provides an interface of the bipole power transmission system. It thus provides an interface of this DC system to the other AC system. In the present example also the converters 42 and 44 of the second converter station 12 are current source converters. They are more particularly acting as an inverter. However, it should be realized that also these may be voltage source converters. They may in fact be voltage source converters even if the converters of the first converter station are current source converters.

The first neutral bus NB1 in the first converter station 10 is connected to a first electrode line L1 leading to a first ground electrode GE1 used for providing neutral point grounding of the first converter station 10. In this first electrode line L1 there is connected a metallic return transfer switch 30 in series with an electrode line disconnector 32.

Also the second converter station 12 comprises a second electrode line L2 connected between a second ground electrode GE2 and the second neutral bus NB2. This second electrode line L2 also comprises an electrode line disconnector 54.

As the converters 14 and 16 of the first converter station 10 act as a rectifier, they deliver power to the converters 42 and 44 of the second converter station 12 via the two pole lines P1 and P2.

As mentioned above, it is also possible that the converters 42 and 44 of the second converter station 12 act as a rectifier, they deliver power to the converters 14 and 16 of the first converter station 10 via the two pole lines P1 and P2. This is typically referred to as reverse power.

In case of a fault or maintenance being performed on a converter in one of the converter stations 10 and 12 and/or on a pole line, it is also possible to connect the second end of the first converter 14 to the second pole line P2 and to connect the first end of the second converter 16 to the first pole line P1, depending on which converter and/or pole line is no longer used because of the fault and/or maintenance. In order to allow such connection to be made there is provided a series circuit. This series circuit comprises a metallic return disconnector 22 and ground return transfer switch 24. The series circuit has a first end that is connectable to either the second end of the first converter 14 via a first metallic return neutral bus disconnector 18 or to the first end of the second converter 16 via a second metallic return neutral bus disconnector 20. A second end of the series circuit is in turn connectable to the first pole line P1 via a first metallic return line disconnector 26 and connectable to the second pole line P2 via a second metallic return line disconnector 28, which two disconnectors are thus connected in series with each other between the two pole lines P1 and P2, where the midpoint is connected to the second end of the series circuit, i.e. to the ground return transfer switch 24.

In a similar manner a first and second metallic return line disconnector 50 and 52 are connected in series between the two pole lines P1 and P2 in the second converter station 12, where the first metallic return line disconnector 50 is connected to the first pole line P1 and the second 52 is connected to the second pole line P2. The midpoint of the series connection is connectable to the second neutral bus NB2 via a first metallic return neutral bus disconnector 46 at the second end of the first converter 42 and via a second metallic return neutral bus disconnector 48 at the first end of the second converter 44.

There is also a first control unit 40 in the first converter station 10 and a second control unit 56 in the second converter station 56 able to communicate with each other via a communication link 38, which link may be an optical fiber link. The first control unit 40 is furthermore shown as controlling the first converter 14, the first metallic return neutral bus disconnector 18, the metallic return disconnector 22, the ground return transfer switch 24, the metallic return line disconnector 28, the metallic return transfer switch 30 and the electrode line disconnector 32. The second control unit 56 is in turn shown as controlling the first metallic return neutral bus disconnector 46 and the second metallic return line disconnector 52.

In the figure there is shown a current $I_{P2}$ in the second pole line P2 and a current $I_{L1}$ in the first electrode line L1.

Finally the first metallic return neutral bus disconnector 18, the metallic return disconnector 22, the ground return transfer switch 24 and second metallic return line disconnector 28 of the first converter station 10 are shown as forming a first current redirecting path CRDP1, while the first metallic return neutral bus disconnector 46 and the second metallic return line disconnector 52 of the second converter station 12 are shown as forming a second current redirecting path CRDP2. It should here be realized that it is possible that also the second metallic return neutral bus disconnectors 20 and 48 are being parts of the corresponding current redirecting paths.

It may here furthermore be mentioned that disconnectors are used for mechanically joining and separating conductors when these are not energized. There are thus no currents running in these conductors when the joining and separating is performed. These may consequently be fairly slow. A switch on the other hand is set to break a connection in a conductor when the conductor is energized. There is thus a current that is handled and the current is interrupted, either when there are natural zero-crossings in the current or through zero-crossings being induced. A switch does therefore have to operate fairly fast.

The bipole system in FIG. 1 may be designed for having the converters 14 and 16 of the first converter station 10 supply power to the converters 42 and 44 of the second converter station 12. This may be done through controlling the first and second converters 14 and 16 to supply a current via the first pole line P1 to the second converter station 12, from where a return current is supplied back via the second pole line P2.

As mentioned previously, there exist situations when normal operation is not possible, i.e. one of the converters of a converter station is not used for active transfer of power. One converter is active, the other is passive. Thereby the pole line connected to the active converter is active, while the pole line connected to the passive converter is also passive. This situation may occur because there is a fault on a converter connected to the passive pole line or perhaps because maintenance is carried out. The bipole system will then be run as an asymmetric monopole system, where, if nothing else is done, a ground return path for the current will be provided through the ground electrodes GE1 and GE2 and ground electrode lines L1 and L2.

If for instance the second pole line P2 of the system in FIG. 1 is passive, the second converter 16 of the first converter station 10 is not used and consequently also the second converter 44 of the second converter station 12 is also not used.

It is in such a case sometimes desirable to use the passive pole line for a metallic return instead of the ground return obtained through the ground electrodes GE1 and GE2 and the two electrode lines L1 and L2. This may be desirable for many different reasons, where one may be because of environmental concerns, such as corrosion.

However, when this has been done the principle has up till now been to use a metallic return transfer breaker in the location of the metallic return transfer switch. This breaker would then comprise a switch in parallel with a resonance circuit as well as a non linear resistor, such as a varistor, in order to obtain a current zero crossing that enables the switch to be opened for interrupting the current and with the varistor counter voltage commutate the current to the pole line and thereby finalize the return current path change.

This breaker is complicated, bulky, maintenance intensive and also expensive. It may also be attractive to make the ground return switch 24 have a similarly simplified environment.

There is in view of this a need to simplify the structure so that it is possible to obtain a change of current path without using such a structure. It would thus be advantageous to only use a switch connected in series with the other elements of the first electrode line L1 between the first neutral bus NB1 and first ground electrode GE1 for interrupting the current in the electrode line and finalizing the return current path change. There are thus no circuit elements in parallel with the metallic return transfer switch 30. It is possible that the first electrode line L1 only comprises or consists of a series-connection of circuit elements, where one of the series connected circuit elements is the metallic return transfer switch 30. As can be seen the metallic return transfer switch may also be connected in series with all other elements of the first electrode line, for instance all disconnectors that can be provided in the line. The metallic return transfer switch 30 may therefore only be connected in series with other elements of the first electrode line. This switch may be a mechanical switch and with advantage a gas-insulated mechanical switch. However, it may be possible to also use other types of switches such as electronic switches. It is likewise possible that the ground return transfer switch is identified in the same way in the relation to the series circuit and the first current redirecting path as the metallic return transfer switch was defined in relation to the first electrode line.

Figure 2:
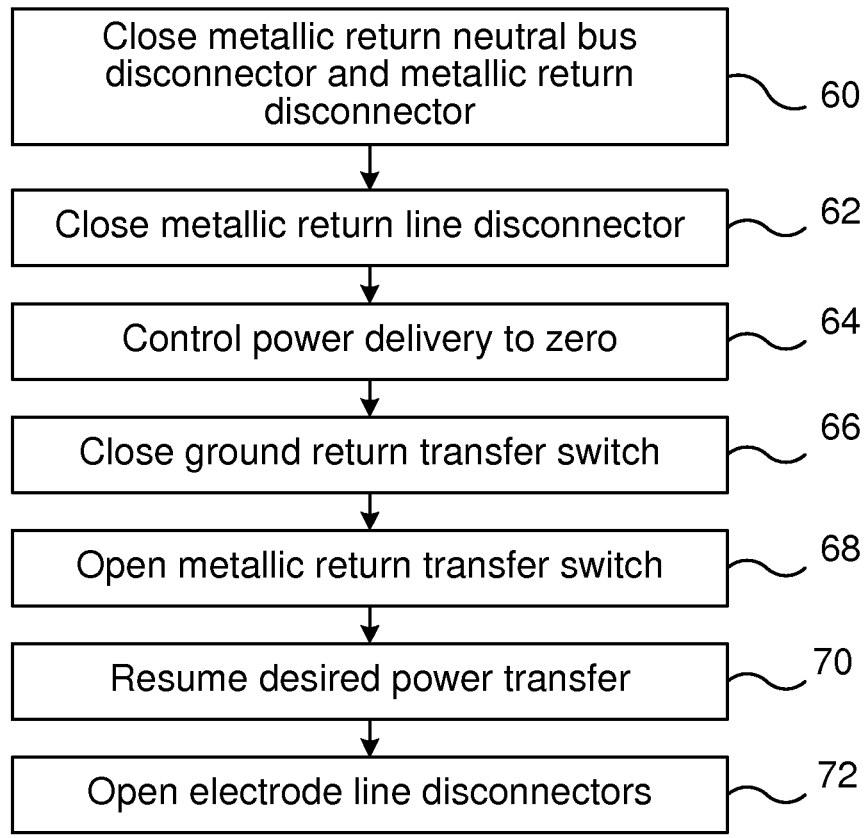
Figure 3:
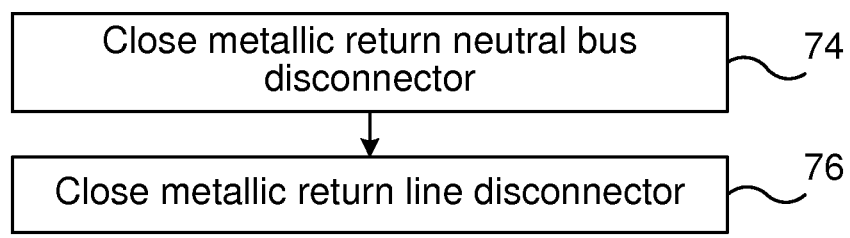

How a simplified structure can be used will now be described with reference also being made to FIGS. 2 and 3 where FIG. 2 shows a number of method steps performed by the first control unit 40 and FIG. 3 shows a number of method steps performed by the second control unit 56 after receiving instructions from the first control unit 40.

In the following it is also assumed that the second pole line P2 is a passive pole line. Furthermore, the second converters 16 and 44 of both the first and the second converter stations 10 and 12 may already be disconnected from the second pole line P2 through the second pole line disconnectors 36 and 58 also being open. This may all have been done by the first and second control units 40 and 56.

Thereby the first converter 14 of the first converter station 10 is active and delivering power to the second converter station 12 through a current running in the first active pole line P1 to the first converter 42 of the second converter station 12, where the return current from the second converter station 12 initially runs from the second neutral bus NB2, the second electrode line L2, the second electrode GE2, earth, the first electrode GE1, the first electrode line L1 and the first neutral bus NB1 to the first converter 14. This current is shown in the first electrode line L1 as the current IL1. The power that is delivered is delivered at a desired power level of steady-state operation, typically according to a number of watts desired to be received at the second converter station 12. Furthermore the first pole line disconnectors 34 and 57 are both closed. All metallic return line disconnectors 26,28,50 and 52 are open. The electrode line disconnectors 32 and 54 are closed and the ground return transfer switch 24 is open. The metallic return transfer switch 30 is closed.

In order to obtain a change of current path so that the return current is provided through the second pole line P2, the end of the active converter that is connected to the neutral bus is made to connect to the passive pole line at a time when the current magnitude in the electrode lines is so small that the change is possible to make through interrupting the current in the electrode line only using the mechanical switch without the aid of a resonance circuit and non linear resistor.

In order to do this the first control unit 40 closes the first metallic return neutral bus disconnector 18 and the metallic return disconnector 22 of the first converter station 10 if these are not already closed, step 60. It may at the same time also instruct the second control unit 56 to close the first metallic return neutral bus disconnector 46 in case this is also open.

Thereafter the first control unit 40 closes the second metallic return line disconnector 28 of the first converter station 10, step 62. Thereby the first current redirecting path CRDP1 is prepared for being formed as soon as the ground return transfer switch GRTS 24 is closed. It may also instruct the second control unit 56 to close metallic return disconnectors, which in this case involves instructing the second control unit 56 to close the second metallic return line disconnector 52 of the second converter station.

After having received instructions, and as can be seen in FIGS. 1 and 3, the second control unit 56 in the second converter station 12 may now close the first metallic return neutral bus disconnector 46, step 74, as well as close the second metallic return line disconnector 52, step 76. Thereby the second current redirection path CRDP2 is created from the end of the active converter 42 that faces the second neutral bus NB2 to the passive pole line P2 in the second converter station 12. This means that in this example the second current redirection path CRDP2 is created from the second end of the first converter 42 to the second pole line P2 via the first metallic return neutral bus disconnector 46 and the second metallic return line disconnector 52.

When the second metallic return line connectors 28 and 52 and the first metallic return neutral bus disconnectors 18 and 46 in both converter stations as well as the metallic return disconnector 22 of the series circuit in the first converter station 10 have been closed, power related to the active converter is controlled from a steady-state power level to zero. Power related to an active converter can either be power delivered into the DC power transmission network or power received from the DC power transmission network. In the present example the active converter 14 delivers power, why it is the power delivered in this case.

The first control unit 40 then continues and controls the power delivery of the active converter in the first converter station 10 from the steady-state level to zero, step 64. This means that in the example given here the power delivery of the first converter 14 is controlled to zero. As the converter is a current source converter this may mean that the current delivered on the active pole line P1 is controlled down from a steady-state current level to zero. In the case of firing angle control this may involve giving the active converter a retard command RET, which is a command to increase the firing angle until full inverter operation has been achieved, which is the limit for firing angles. The firing angle is thus increased to the maximum firing angle at which no current is delivered.

When this has been done, the first control unit 40 continues and operates the ground return transfer switch 24 and the metallic return transfer switch 30 between an open and a closed state, where the state change of the metallic return transfer switch 30 is the opposite of the state change of the ground return transfer switch 24. In the example given here the ground return transfer switch 24 is operated from an open to a closed state and the metallic return transfer switch 30 is operated from a closed to an open state.

Therefore, the first control unit 40 first closes the ground return transfer switch 24, step 66. Thereby the first current redirection path CRDP1 is created from the end of the active converter that faces the first neutral bus NB1 to the passive pole line P2 in the first converter station 10. This means that in this example the first current redirection path CRDP1 is created from the second end of the first converter 14 to the second pole line P2 via the first metallic return neutral bus disconnector 18, the metallic return disconnector 22, the ground return transfer switch 24 and the second metallic return line disconnector 28.

Thereby a new path for the return current is created based on the first and second current redirecting paths CRDP1 and CRDP2 and the passive pole line P2.

Due to the retard command the currents and the especially the electrode line current $I_{L1}$, will be zero, which enables the use of the metallic return transfer switch 30 to interrupt the current without the use of any resonance circuit or non linear resistor.

Therefore the first control unit 40, at the detection of a zero current in the electrode line current $I_{L1}$ interrupts the current through opening the metallic return transfer switch 30, step 68, and thereby the return current will no longer be able to pass the electrode lines L1 and L2 but only through the second pole line P2, which is thereby no longer passive. After this the current paths have been successfully changed and it is now possible to control the power related to the active converter back to the steady state power level. This is in the present example done through the first control unit 40 controlling the active converter to resume the desired power transfer, step 70, which involves returning to delivering power at the previous steady-state power level. This may involve returning to using the initial firing angle existing before power delivery was controlled to zero. It can in this way be seen that steady-state operation resumed.

The first control unit 40 may then open the electrode line disconnector 32 in the first electrode line L1 for isolating the first ground electrode GE1 from the return current path, step 72.

Figure 4:
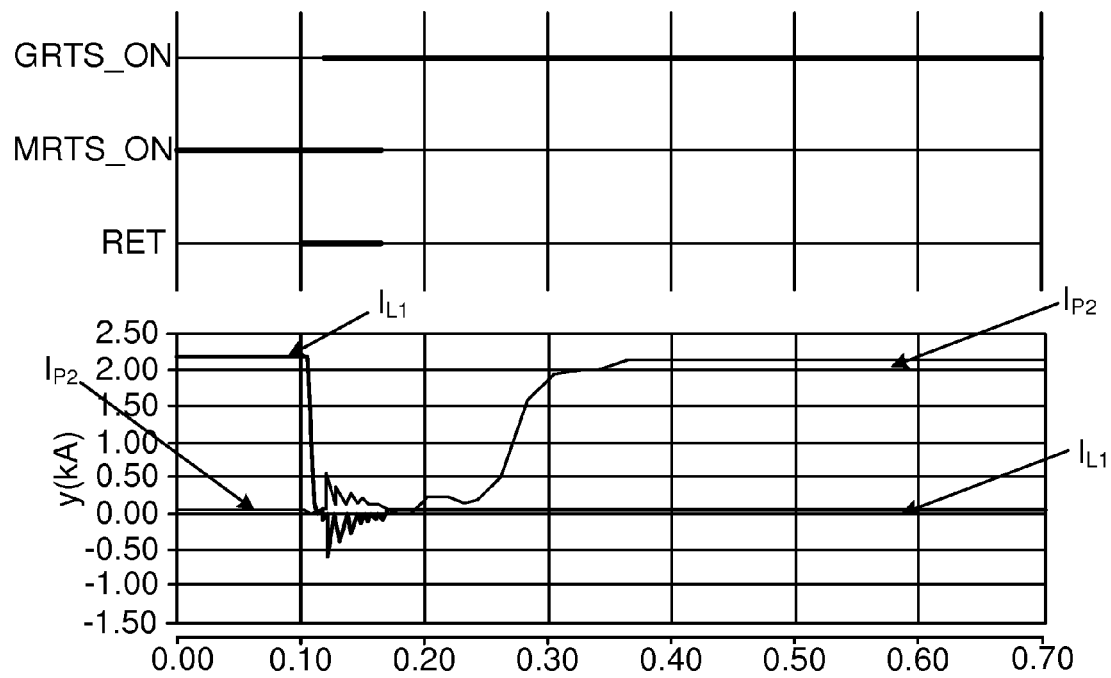

In FIG. 4 there are shown simulations of the control signal GRTS_ON used for closing the ground return transfer switch 24, a control signal MRTS_ON (closing) used for closing the metallic return transfer switch 30 and the Retard signal RET used to control the active converter 14 to as well as the current $I_{L1}$ in the first electrode line L1 and the current $I_{P2}$ in the second pole line P2. The simulations correspond to the steps 64-70 of FIG. 2.

As can be seen the metallic return transfer switch 30 is closed (on) at time 0.00 s because of the on state of the signal MRTS_ON and consequently the only return current is the current $I_{L1}$ in the first electrode line L1. Then at a time 0.1 s a retard command RET is given, which reduces the electrode line current $I_{L1}$ to zero within 10 ms. 20 ms after the generation of the retard command RET, the ground return transfer switch 24 is turned on (closed) by the command GRTS_ON, which makes the return current be shared by the electrode line L1 and the second pole line P2. Even though there is no current control because of the use of the retard command RET, there are still some residual currents that are hard to avoid. These are caused by induced currents and charges. It is then possible to look for a current zero crossing in the induced current in the electrode line L1.

Approximately 45 ms after the turning on of the ground return transfer switch 24, there is a current zero crossing in the electrode line current IL1, at which time the metallic return transfer switch 30 is opened and also the retard command RET disabled. It can be seen that after this has taken place, there is no current any more in the first electrode line L1, only in the second pole line P2. Furthermore it can be seen that normal steady-state operation is resumed fairly fast. Steady state is as an example resumed approximately 150 ms after the suspension of the retard order.

It can thereby also be seen that the operation is fast.

A simulation has also been made with a closing of the ground return transfer switch before the retard RET command was given. In this case the reduction of the current to a level where there was zero crossings was remarkably longer than in the case with closing after the retard command RET. The retard order was required to be kept almost for 1 s before the metallic return transfer switch could be opened, which should be compared with 65 ms for the described embodiment.

The closing of ground return transfer switch after the generation of the Retard command RET, thus surprisingly showed that the time of reduced power delivery capacity was significantly lower than when the opposite order of operation was used.

There are several variations that are possible to make of the invention.

First of all it has to be mentioned that it is possible to resume using the electrode line for the return current path. This can be done just before bipole operation is to be resumed, for instance if maintenance is finished. Basically the reversed order of operation would then be used.

The operation in the first converter station 10 would then be the following. If open, the electrode line disconnector 32 in the first electrode line L1 is first closed. Thereafter power delivery is controlled down to zero by the first control unit 40. This is then followed by the closing of the metallic return transfer switch 30. Thereafter the ground return transfer switch 24 is opened, which is followed by resuming desired power transfer, opening of the second metallic return line disconnector 28 and possibly also opening of the metallic return neutral bus disconnectors 18 and 22.

In the second converter station 12, the second metallic return line disconnector 52 and first metallic return neutral bus disconnector 46 may then also be opened in synchronism with the opening of the corresponding disconnectors in the first converter station 10.

In some DC power transmission systems there is a dedicated metallic return electrode line connected between the neutral buses of two converter stations instead of the two electrode lines with ground electrodes. In this case it is possible to only connect the passive pole in parallel with the electrode line without disconnecting the electrode line. This means that in this case the metallic return transfer switch does not need to be opened. However, the ground return transfer switch will be first closed for using the passive pole for a current return path. It is thereafter opened in order to allow bipole operation to be resumed. This later opening may then be performed during control of the delivered power down to zero.

As was described above the principles can also be used in voltage source converters. In this case the control of power from a steady-state level to zero is performed through the voltage of the active voltage source converter of a converter station being controlled so that no power is delivered. This may involve lowering the voltage of the active voltage source converter in the converter station that delivers power so that the voltage difference to the receiving voltage source converter at the other end of the active pole line is zero or close to zero and then a path change is made in the above-described way.

In the example given above the first converters and the first pole line were active, while the second converters and second pole line were passive and consequently there was no current in the second pole line. It is possible to in a similar way allow the second converters and second pole line to be active and the first converters and first pole line to be passive. In this case the second metallic return neutral bus disconnectors are used instead of the first metallic return neutral bus disconnectors and the first metallic return line disconnectors are used instead of the second metallic return line disconnectors.

Furthermore, in the above described example the first converter station was delivering power to the second converter station. It is also possible that it is receiving power from the second converter station, in which case the converters of the first converter station may act as inverters. In this case the control of power to zero and back may be made by the second converter station and reported to the first converter station, which would then control the ground return transfer switch and metallic return transfer switch. Thereafter the second converter station could return control back to steady state.

It is also possible that power delivery and switch control is performed in a converter station receiving power. Power delivery can for instance easily be controlled at this end using voltage source converters through raising the DC voltage.

It is likewise possible that switch control is performed in a converter station delivering power and that power delivery control is performed at the converter station receiving power.

Figure 5:
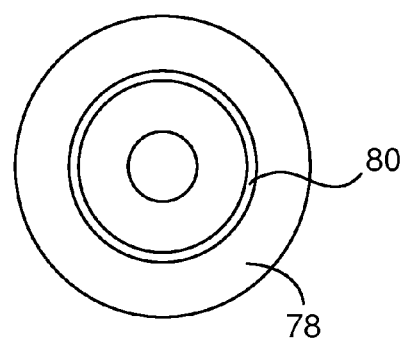
FIG. 5 shows a computer program product in the form of a data carrier with computer program code implementing control unit functionality.

The control units may each be realized in the form of discrete components. However, they may each also be implemented in the form of a processor with accompanying program memory comprising computer program code that performs the desired control functionality when being run on the processor. A computer program product carrying such code can be provided as a data carrier such as one or more CD ROM discs or one or more memory sticks carrying the computer program code, which performs the above-described control functionality when being loaded into a control unit of a converter station converter. FIG. 5 shows one example of a data carrier in the form of a CD Rom disc 78 comprising computer program code 80 implementing the control method used by the first and possibly also the second control unit.

A number of elements shown in FIG. 1 are not really necessary for the operation of the invention. It is for instance possible to omit the metallic return disconnector and the metallic neutral bus return disconnectors. Also the pole line disconnectors may be omitted.

From the foregoing discussion it is evident that the present invention can be varied in a multitude of ways. It shall consequently be realized that the present invention is only to be limited by the following claims.

The invention claimed is:

1. An arrangement for changing a current return path in a bipole direct current power transmission system, said arrangement comprising:
    a first converter station providing an interface of the bipole direct current power transmission system and having:
        an active and a passive converter connected in series between an active pole line and a passive pole line via a first neutral bus;
        a first electrode line connected to the first neutral bus;
        a ground return transfer switch connected in a first current redirecting path between the passive pole line and the first neutral bus;
        a metallic return transfer switch connected in the first electrode line; and
        a first control unit which, in the case of a change in return current path and upon control of power related to the active converter from a steady-state power level to zero, is configured to:
            operate the ground return transfer switch to change between an open and a closed state, whereupon the power related to the active converter may be controlled back to the steady state power level; and
            in case the change is a change between using the first electrode line and the passive pole line for a return current path, the first control unit being further configured to operate the metallic return transfer switch to change between an open and a closed state, where the state change of the metallic return transfer switch is the opposite of the state change of the ground return transfer switch.

2. The arrangement according to claim 1, wherein the first control unit is further configured to control the power related to the active converter from the steady-state power level to zero and to control the power back to a steady-state power level after the opening of the metallic return transfer switch.

3. The arrangement according to claim 1, wherein the active converter delivers power at the steady state power level into the bipole power transmission system.

4. The arrangement according to claim 1, wherein the ground return transfer switch is only connected in series with all other elements of the first current redirecting path.

5. The arrangement according to claim 1, wherein the metallic return transfer switch is only connected in series with all other elements of the first electrode line.

6. The arrangement according to claim 1, wherein the first control unit, in the case of a change from using the first electrode line to the passive pole line for a return current path and upon control of power related to the active converter from a steady-state power level to zero is configured to close the ground return transfer switch for interconnecting the active converter with the passive pole line, and thereafter open the metallic return transfer switch for breaking the connection between the active converter and the first electrode line, whereupon said control of the power related to the active converter back to the steady state power level change may take place.

7. The arrangement according to claim 6, wherein the metallic return transfer switch is opened at a current zero crossing caused by said control of power to zero.

8. The arrangement according to claim 6, wherein the first current redirecting path comprises a metallic return line disconnector between the ground return transfer switch and the passive pole line and the first control unit is further configured to close the metallic return line disconnector in said first current redirecting path before closing the ground return transfer switch.

9. The arrangement according to claim 8, wherein the first control unit is configured to operate the metallic return line disconnector in synchronism with the operation of a corresponding return line disconnector at a second converter station at an opposite end of the active and passive pole lines.

10. The arrangement according to claim 9, wherein the first electrode line is connected to ground via a first ground electrode and further comprising the second converter station with an active and a passive converter connected in series between the active and passive pole lines via a second neutral bus, a second electrode line connected between a second ground electrode and the second neutral bus, a second current redirecting path between the passive pole line and the second neutral bus comprising said metallic return line disconnector and a second control unit, which in the case of a change from using the second electrode line to using the passive pole line for providing a return current path for power transmitted via the active pole line, is configured to close the metallic return line disconnector before the first control unit closes the ground return transfer switch.

11. The arrangement according to claim 1, wherein the first control unit, in the case of a change from using the passive pole line to using the first electrode line for a return current path and upon control of power related to the active converter from a steady-state power level to zero is configured to close the metallic return transfer switch for interconnecting the active converter with the first electrode line and thereafter to open the ground return transfer switch for breaking the connection between the active converter and the passive pole line, whereupon said control of the power related to the active converter back to the steady state power level change may take place.

12. The arrangement according to claim 1, wherein the converters of the first converter station are current source converters.

13. The arrangement according to claim 1, wherein the converters of the first converter station are voltage source converters.

14. The arrangement according to claim 1, wherein the metallic return transfer switch is a mechanical switch.

15. The arrangement according to claim 1, wherein the ground return transfer switch is a mechanical switch.

16. A method for changing a current return path in a bipole direct current power transmission system comprising a first converter station providing an interface of the bipole direct current power transmission system and having:
   an active and a passive converter connected in series between an active pole line and a passive pole line via a first neutral bus;
   a first electrode line connected to the first neutral bus;
   a ground return transfer switch connected in a first current redirecting path between the passive pole line and the first neutral bus; and
   a metallic return transfer switch connected in the first electrode line,
   wherein the method is performed in the bipole power transmission system and comprises:
   in the case of a change in return current path and upon control of power related to the active converter from a steady-state power level to zero, operating the ground return transfer switch to change between an open and a closed state, whereupon the power related to the active converter may be controlled back to the steady state power level; and
   in case the change is a change between using the first electrode line and the passive pole line for a return current path, operating the metallic return transfer switch to change between an open and a closed state, where the state change of the metallic return transfer switch is the opposite of the state change of the ground return transfer switch.

17. The method according to claim 16, further comprising controlling the power related to the active converter from a steady-state power level to zero and controlling the power related to the active converter back to the steady-state power level after the opening of the metallic return transfer switch.

18. The method according to claim 16, wherein the active converter delivers power at the steady state power level into the bipole power transmission system.

19. The method according to claim 16, wherein the ground return transfer switch is only connected in series with all other elements of the first current redirecting path.

20. The method according to claim 16, wherein the metallic return transfer switch is only connected in series with other elements of the first electrode line.

21. The method according to claim 16, wherein the change between use of the first electrode line and the passive pole line comprises a change from using the first electrode line to using the passive pole line, the operating of the ground return transfer switch comprises closing the ground return transfer switch for interconnecting the active converter with the passive pole line, and the operating of the metallic return transfer switch comprises opening, after the closing of the ground return transfer switch, the metallic return transfer switch for breaking the connection between the active converter and the first electrode line.

22. The method according to claim 21, wherein the metallic return transfer switch is opened at a current zero crossing caused by said control of power to zero.

23. The method according to claim 21, wherein the first current redirecting path comprises a metallic return line disconnector between the ground return transfer switch and the passive pole line and the method further comprises closing said metallic return line disconnectors before closing the ground return transfer switch.

24. The method according to claim 23, wherein the operation of the metallic return line disconnector is made in synchronism with operation of a corresponding return line disconnector being made at a second converter station at an opposite end of the active and passive pole lines.

25. The method according to claim 24, wherein the first electrode line connected to ground via a first ground electrode and the second converter station comprises an active and a passive converter connected in series between the active and passive pole lines via a second neutral bus, a second electrode line between a second ground electrode and the second neutral bus, a second current redirecting path between the passive pole line and the second neutral bus comprising said metallic return line disconnector, the method further comprising closing the metallic return line disconnector in the second converter station before the ground return transfer switch is closed.

26. The method according to claim 16, wherein the change between use of the first electrode line and the passive pole line comprises a change from using the passive pole line to using the first electrode line and the operation of the metallic return transfer switch comprises closing the metallic return transfer switch for interconnecting the active converter with the first electrode line, and the operation of the ground return transfer switch comprises opening, after the closing of the metallic return transfer switch, the ground return transfer switch for breaking the connection between the active converter and the passive pole line.

27. A computer program product for changing a current return path in a bipole direct current power transmission system comprising a first converter station providing an interface of the bipole direct current power transmission system and having:
   an active and a passive converter connected in series between an active pole line and a passive pole line via a first neutral bus;
   a first electrode line connected to the first neutral bus;
   a ground return transfer switch connected in a first current redirecting path between the passive pole line and the first neutral bus; and
   a metallic return transfer switch connected in the first electrode line,
   the computer program product comprising a non-transitory data carrier with computer program code implementing the functionality of a control unit of at least the first converter station, the computer program code being configured to, when the code is loaded in a computer that implements the control unit:
   in case of a change in return current path as well as upon control of power related to the active converter from a steady-state power level to zero, operate the ground return transfer switch to change between an open and a closed state, whereupon the power related to the active converter may be controlled back to the steady state power level; and in case the change is a change between using the first electrode line and the passive pole line for a return current path being further operate the metallic return transfer switch to change between an open and a closed state, where the state change of the metallic return transfer switch is the opposite of the state change of the ground return transfer switch.

\* \* \* \* \*